United States Patent

Bergmann et al.

Patent Number: 4,638,055
Date of Patent: Jan. 20, 1987

[54] IRON, COPPER AND CHROMIUM COMPLEXES OF DISAZO DYES

[75] Inventors: Udo Bergmann, Darmstadt; Guenter Hansen, Ludwigshafen; Georg Zeidler, Dannstadt-Schauernheim, all of Fed. Rep. of Germany

[73] Assignee: BASF Aktiengesellschaft, Ludwigshafen, Fed. Rep. of Germany

[21] Appl. No.: 721,712

[22] Filed: May 10, 1985

Related U.S. Application Data

[63] Continuation of Ser. No. 478,101, Mar. 23, 1983, Pat. No. 4,547,566.

[30] Foreign Application Priority Data

Apr. 2, 1982 [DE] Fed. Rep. of Germany ....... 3212240

[51] Int. Cl.⁴ .................. C09B 45/26; C09B 45/30; C09B 45/32; C09B 45/58
[52] U.S. Cl. .................. 534/678; 534/679; 534/684; 534/688
[58] Field of Search ............ 534/679, 684, 678

[56] References Cited

U.S. PATENT DOCUMENTS

| | | | |
|---|---|---|---|
| 2,042,810 | 6/1936 | Straub et al. | 534/684 |
| 2,111,559 | 3/1938 | Fellmer | 534/684 |
| 2,136,650 | 11/1938 | Crossley et al. | 534/684 |
| 2,152,652 | 4/1939 | Lange | 534/684 |
| 2,175,187 | 10/1939 | Fellmer | 534/684 |
| 2,188,774 | 1/1940 | Fellmer | 534/684 |
| 2,200,445 | 5/1940 | Fellmer | 534/684 |
| 2,257,165 | 9/1941 | Fellmer | 534/684 |
| 2,830,979 | 4/1958 | Goebel et al. | 534/684 |
| 4,120,854 | 10/1978 | Wicki | 534/684 |
| 4,263,229 | 4/1981 | Studer | 534/684 |

FOREIGN PATENT DOCUMENTS

| | | | |
|---|---|---|---|
| 278142 | 11/1913 | Fed. Rep. of Germany | 534/684 |
| 781862 | 5/1935 | France | 534/684 |
| 2096040 | 2/1972 | France | 534/684 |
| 440150 | 12/1935 | United Kingdom | 534/684 |
| 1299033 | 12/1972 | United Kingdom | 534/684 |

*Primary Examiner*—Floyd D. Higel
*Attorney, Agent, or Firm*—Oblon, Fisher, Spivak, McClelland & Maier

[57] ABSTRACT

Compounds which in the form of the free acid are of the general formula I

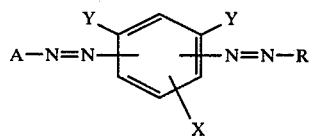

where A is a radical of the formula

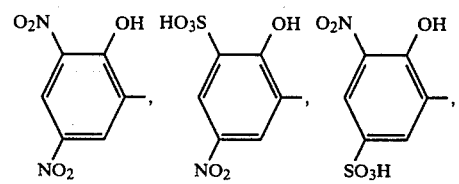

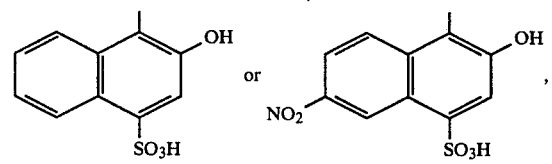

the radicals Y independently of one another are each hydroxyl or amino, X is hydrogen, hydroxysulfonyl or a radical of the formula

D—N=N—,

R is a radical of 1-aminonaphthalene-4-, -5-, -6-, -7-or -8-monosulfonic acid or of 1-aminonaphthalene-3-6,-, -3,7-, -3,8-, -4,7- or -4,8-disulfonic acid, or a Cu, Fe, Ni, Co, Mn or Cr complex thereof, and D is phenyl which is unsubstituted or substituted by methyl, methoxy,ethoxy, nitro, chlorine, bromine or sulfo, or is sulfo-substituted naphthyl. These compounds are preferably used for dyeing leather.

4 Claims, No Drawings

IRON, COPPER AND CHROMIUM COMPLEXES OF DISAZO DYES

This is a continuation of application Ser. No. 478,101, filed Mar. 23, 1983, now U.S. Pat. No. 4,547,566.

The present invention relates to compounds which in the form of the free acids are of the general formula

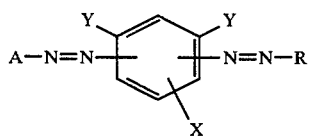

where A is a radical of the formula

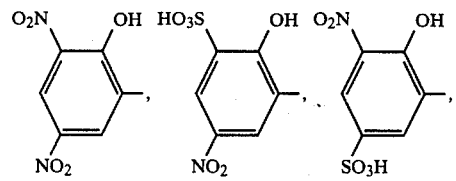

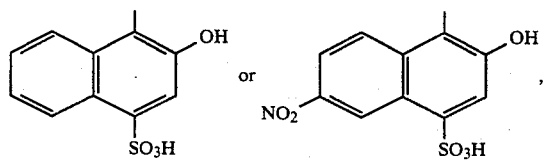

the radicals Y independently of one another are each hydroxyl or amino, X is hydrogen, hydroxysulfonyl or a radical of the formula

D—N=N—,

R is a radical of 1-aminonaphthalene-4-, -5-, -6-, -7- or -8-monosulfonic acid or of 1-aminonaphthalene-3,6-, -3,7-, -3,8-, -4,7- or -4,8-disulfonic acid, or a Cu, Fe, Ni, Co, Mn or Cr complex thereof, and D is phenyl which is unsubstituted or substituted by methyl, methoxy, ethoxy, nitro, chlorine, bromine or sulfo, or is sulfo-substituted naphthyl.

The compounds of the formula I can be prepared by reacting a compound of the formula

with a diazo compound of an amine of the formula

R—NH$_2$ and, if desired, converting the coupling product to a metal complex. The reactions are known in principle, and do not possess any special features compared with the preparation of known substances.

R is particularly preferably 4-, 6- or 8-sulfonaphthyl or the Fe complex.

Furthermore, Y is preferably hydroxyl and X is preferably hyrogen, and preferred dye mixtures are those containing a compound in which X is H with about 5–20% of a compound in which X is D—N=N—.

The compounds of the formula I are particularly useful for dyeing leathers, such as those retanned with vegetable or synthetic tanning agents. Fast brown dyeings are obtained.

In the Examples which follow, parts and percentages are by weight, unless stated otherwise.

EXAMPLE 1

19.9 parts of 1-amino-2-hydroxy-3,5-dinitrobenzene are diazotized in a conventional manner, and the product is coupled to 11 parts of resorcinol in a solution rendered alkaline with sodium carbonate. The diazonium salt obtained from 22.3 parts of 1-aminonaphthalene-4-sulfonic acid is then added to the suspension, at pH 8–9. After coupling is complete, the reaction mixture is brought to pH 5 with acetic acid, 38 parts of anhydrous iron(III) chloride are added, and the mixture is heated at 90°–95° C. for about 3 hours, at pH 4–5.

When metallization is complete, the dye is precipitated by the addition of sodium chloride, isolated and dried. The iron complex of the compound of the formula

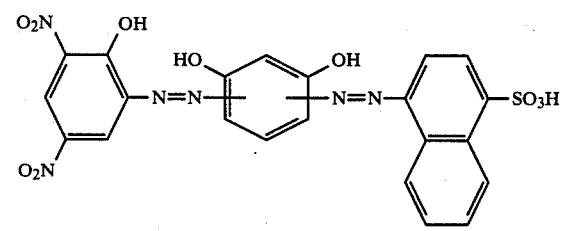

dyes leather in lightfast and wetfast yellowish brown hues.

The dyes listed in the Table below can be synthesized by the above method.

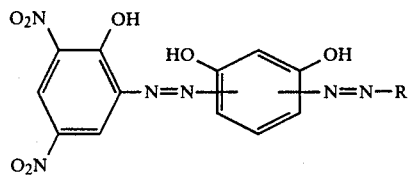

| Example | R | Hue of the dyeing on leather, obtained with the metal complex | | | | |
|---|---|---|---|---|---|---|
| | | Cu | Cr | Co | Ni | Fe |
| 2 | ![naphthalene with SO3H at 1-position, attached at 5] | reddish-brown | | | | yellowish-brown |
| 3 | ![naphthalene with SO3H at 2-position, attached at 8] | | reddish-brown | | | yellowish-brown |
| 4 | ![naphthalene with SO3H at 2-position, attached at 8] | | | | reddish-brown | |
| 5 | ![naphthalene with SO3H at 1-position, attached at 8] | reddish-brown | | | | |
| 6 | ![naphthalene with two SO3H groups (2,6-disulfo), attached at 8] | | | | | yellowish-brown |

-continued

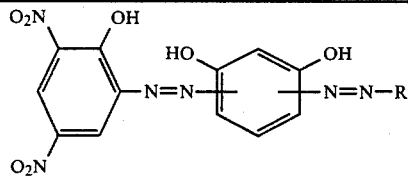

| Example | R | Hue of the dyeing on leather, obtained with the metal complex | | | | |
|---|---|---|---|---|---|---|
| | | Cu | Cr | Co | Ni | Fe |
| 7 | (1,6-naphthalenedisulfonic acid, SO₃H at 2 and 6 positions) | | | reddish-brown | | |

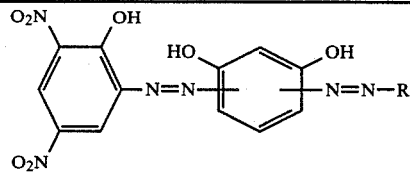

| Example | R | Hue of the dyeing on leather, obtained with the metal complex | | | | |
|---|---|---|---|---|---|---|
| | | Cu | Cr | Co | Ni | Fe |
| 8 | (naphthalene with SO₃H groups) | reddish-brown | | | | yellowish-brown |
| 9 | (naphthalene with SO₃H groups) | | reddish-brown | | reddish-brown | yellowish-brown |
| 10 | (naphthalene with SO₃H groups) | | | reddish-brown | | |

EXAMPLE 11

19.9 parts of 1-amino-2-hydroxy-3,5-dinitrobenzene are diazotized in a conventional manner, and the product is coupled to 11 parts of resorcinol in a solution rendered alkaline with sodium carbonate. The diazonium salt obtained from 22.3 parts of 1-aminonaphthalene-4-sulfonic acid is then added to the suspension, at pH 8–9. After formation of the disazo dye is complete, the diazo compound obtained from 21.8 parts of 1-amino-2-sulfo-4-nitrobenzene is added in such a manner that coupling takes place at a pH of from 6 to 7. When coupling is complete, the reaction mixture is brought to pH 5 with acetic acid, and complexing with anhydrous iron(III) chloride is carried out by a procedure similar to that described in Example 1.

When metallization is complete, the dye is precipitated by the addition of sodium chloride, isolated and dried. The iron complex of the compound of the formula

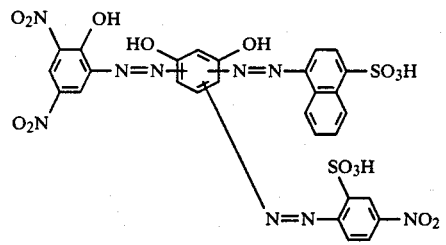

gives lightfast and wetfast brown dyeings on chrome side leather retanned with vegetable or synthetic tanning agents.

The dyes listed in the Table below can be prepared by the above method.

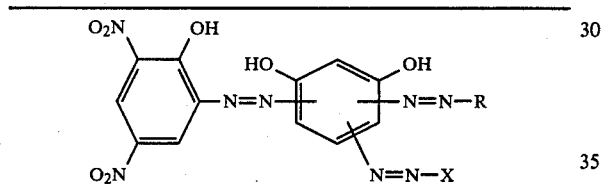

| Example | R | X | Hue of the Fe complex on leather |
|---|---|---|---|
| 12 | ―naphthyl-SO₃H (1-naphthyl, SO₃H at 4) | ―phenyl-SO₃H | yellowish-brown |
| 13 | ―naphthyl-SO₃H | ―phenyl(NO₂)(SO₃H) | brown |
| 14 | ―naphthyl-SO₃H | ―phenyl(SO₃H)(SO₃H) | yellowish-brown |
| 15 | ―naphthyl-SO₃H | ―naphthyl-SO₃H | brown |
| 16 | ―naphthyl(SO₃H)(SO₃H) | ―phenyl-NO₂ | reddish-brown |

-continued

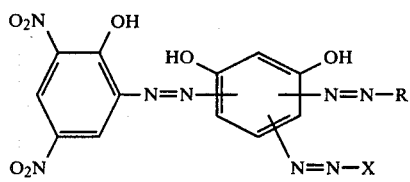

| Example | R | X | Hue of the Fe complex on leather |
|---|---|---|---|
| 17 | " | ―phenyl-OCH₃ (ortho) | brown |
| 18 | ―naphthyl(SO₃H)(SO₃H) | ―phenyl-OCH₃ | brown |
| 18a | ―naphthyl-SO₃H | ―naphthyl-SO₃H | brown |

EXAMPLE 19

23.4 parts of 6-nitro-2-amino-1-phenol-4-sulfonic acid are diazotized in a conventional manner, and the product is coupled to 11 parts of resorcinol in a solution which has been rendered alkaline with sodium carbonate. The diazonium salt obtained from 22.3 parts of 1-aminonaphthalene-4-sulfonic acid is then added to the suspension, at pH 8–9. When coupling is complete, the disazo dye is complexed with iron(III) chloride by a procedure similar to that described in Example 1, and the complex is isolated.

The iron complex of the compound of the formula

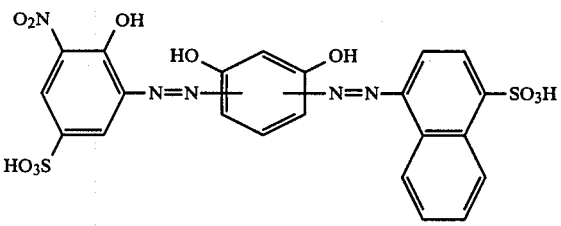

dyes leather in yellowish brown hues with good tinctorial properties.

The dyes listed in the Table below can be prepared by the method described in Example 19.

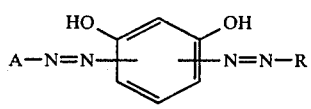

| Example | A | R | Hue of the Fe complex on leather |
|---|---|---|---|
| 20 | HO₃S–/OH/–NO₂ (with CH₃) | naphthyl-SO₃H (1-position) | yellowish-brown |
| 21 | HO₃S–/OH/–NO₂ (with CH₃) | naphthyl-SO₃H (2-position) | yellowish-brown |
| 22 | HO₃S–/OH (naphthyl) | naphthyl-SO₃H | yellowish-brown |
| 23 | HO₃S–/OH/–NO₂ (naphthyl) | naphthyl-SO₃H | yellowish-brown |

EXAMPLE 24

23.4 parts of 4-nitro-2-amino-1-phenol-6-sulfonic acid are coupled to 11 parts of resorcinol in a conventional manner, in a solution rendered alkaline with sodium carbonate. The diazonium salt obtained from 22.3 parts of 1-aminonaphthalene-4-sulfonic acid is then added to the monoazo dye, at pH 8–9. When the formation of the disazo dye is complete, the product is coupled, at pH 6–7, to the diazo compound obtained from 11.1 parts of 1-amino-2-methoxybenzene, and the dye is then complexed with iron(III) chloride by a procedure similar to that described in Example 1, and the complex is isolated.

The iron complex of the compound of the formula

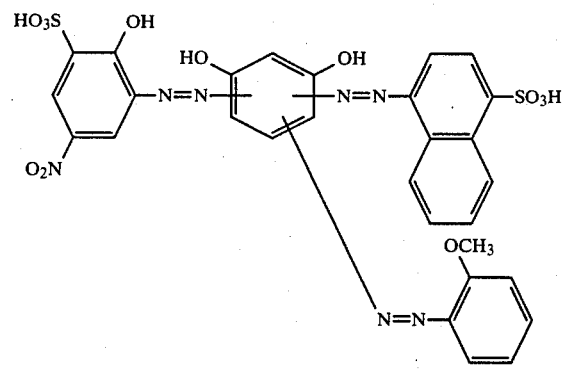

dyes leather in yellowish brown hues with good all-round fastness.

The dyes listed in the Table below can be synthesized by the above method.

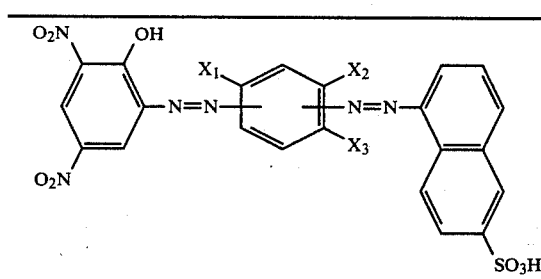

| Example | X₁ | X₂ | X₃ | Hue of the Fe complex on leather |
|---|---|---|---|---|
| 29 | OH | NH₂ | H | brown |
| 30 | NH₂ | NH₂ | H | brown |
| 31 | NH₂ | NH₂ | SO₃H | brown |

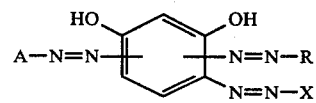

| Example | A | R | X | Hue of the Fe complex on leather |
|---|---|---|---|---|
| 25 | HO₃S–/OH/–NO₂ | naphthyl-SO₃H | –C₆H₄–OCH₃ | brown |
| 26 | O₂N–/OH/–HO₃S | naphthyl-SO₃H | –C₆H₄–NO₂ | brown |

-continued

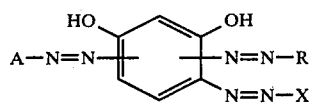

| Example | A | R | X | Hue of the Fe complex on leather |
|---|---|---|---|---|
| 27 | OH, HO₃S on naphthol | naphthyl-SO₃H | o-OCH₃-phenyl | brown |
| 28 | OH, HO₃S, NO₂ on naphthol | naphthyl-SO₃H | p-NO₂-phenyl | brown |

We claim:

1. A metal complex selected from the group consisting of Fe, Co or Cr of the compound which in free acid form corresponds to the formula

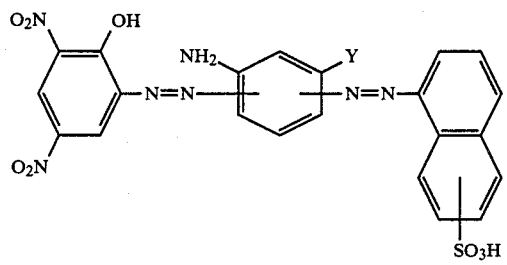

wherein
Y is hydrogen or amino.

2. A complex according to claim 1 of the formula

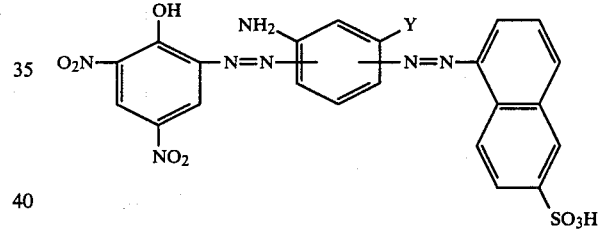

wherein
Y is hydrogen or amino.

3. An iron complex according to claim 1.

4. An iron complex according to claim 1 wherein Y is hydroxy.

* * * * *

UNITED STATES PATENT AND TRADEMARK OFFICE
CERTIFICATE OF CORRECTION

PATENT NO. : 4,638,055
DATED : January 20, 1987
INVENTOR(S) : Bergmann et al

It is certified that error appears in the above-identified patent and that said Letters Patent is hereby corrected as shown below:

Claims 1 and 2, below the formula, after "wherein", change "Y is hydrogen or amino." to --Y is hydroxy or amino.--.

Signed and Sealed this

Twenty-seventh Day of November, 1990

*Attest:*

HARRY F. MANBECK, JR.

*Attesting Officer*   *Commissioner of Patents and Trademarks*